(12) United States Patent
Jackson

(10) Patent No.: US 10,339,339 B2
(45) Date of Patent: Jul. 2, 2019

(54) SECURELY STORING AND DISTRIBUTING SENSITIVE DATA IN A CLOUD-BASED APPLICATION

(71) Applicant: MOBILEIRON, INC., Mountain View, CA (US)

(72) Inventor: Timothy Jackson, Sunnyvale, CA (US)

(73) Assignee: MOBILERON, INC., Mountain View, CA (US)

( * ) Notice: Subject to any disclaimer, the term of this patent is extended or adjusted under 35 U.S.C. 154(b) by 150 days.

(21) Appl. No.: 15/429,620

(22) Filed: Feb. 10, 2017

(65) Prior Publication Data

US 2017/0228559 A1 Aug. 10, 2017

Related U.S. Application Data

(60) Provisional application No. 62/293,437, filed on Feb. 10, 2016.

(51) Int. Cl.
| | |
|---|---|
| *G06F 9/00* | (2006.01) |
| *G06F 21/62* | (2013.01) |
| *H04L 9/08* | (2006.01) |
| *H04L 9/30* | (2006.01) |
| *H04L 29/06* | (2006.01) |
| *H04L 9/14* | (2006.01) |

(52) U.S. Cl.
CPC ...... *G06F 21/6245* (2013.01); *G06F 21/6209* (2013.01); *H04L 9/0894* (2013.01); *H04L 9/14* (2013.01); *H04L 9/30* (2013.01); *H04L 63/0281* (2013.01); *H04L 63/0428* (2013.01); *H04L 63/0464* (2013.01); *H04L 63/083* (2013.01); *H04L 2209/76* (2013.01)

(58) Field of Classification Search
CPC ...... G06F 21/6245; H04L 9/30; H04L 63/083
USPC ...... 713/165
See application file for complete search history.

(56) References Cited

U.S. PATENT DOCUMENTS

| | | | |
|---|---|---|---|
| 2006/0005237 A1* | 1/2006 | Kobata | H04L 63/0823 726/12 |
| 2009/0019533 A1* | 1/2009 | Hazlewood | H04L 63/083 726/5 |
| 2010/0199095 A1* | 8/2010 | Ho | H04L 9/0844 713/171 |
| 2010/0250442 A1* | 9/2010 | Coppinger | G06Q 20/20 705/75 |
| 2011/0113240 A1* | 5/2011 | Fu | H04L 63/0823 713/156 |
| 2011/0219229 A1* | 9/2011 | Cholas | G06F 21/00 713/168 |
| 2011/0264920 A1* | 10/2011 | Rieffel | H04L 9/008 713/189 |
| 2011/0296171 A1 | 12/2011 | Fu | |

(Continued)

*Primary Examiner* — Haresh N Patel
(74) *Attorney, Agent, or Firm* — Van Pelt, Yi & James LLP

(57) ABSTRACT

Techniques to securely store and retrieve data are disclosed. In various embodiments, a process of retrieving secure data includes receiving a request, where the request includes a first secret data and a second secret data. The process further includes identifying a first encrypted data to retrieve based on the request, using the first secret data to decrypt the first encrypted data to generate a decrypted data, generating a second encrypted data, where the second encrypted data is encrypted using the second secret data. In response to the request, the second encrypted data is provided.

17 Claims, 14 Drawing Sheets

(56) References Cited

U.S. PATENT DOCUMENTS

| | | |
|---|---|---|
| 2012/0239942 A1 | 9/2012 | Yan |
| 2013/0019103 A1 | 1/2013 | Read |
| 2013/0111217 A1* | 5/2013 | Kopasz ............... G06F 21/6245 713/189 |
| 2013/0114597 A1* | 5/2013 | Ogisawa ............... H04L 12/185 370/390 |
| 2013/0191905 A1 | 7/2013 | Harada |
| 2013/0305392 A1 | 11/2013 | Bar-El |
| 2014/0052985 A1* | 2/2014 | Yang .................. H04L 63/0428 713/168 |
| 2014/0068258 A1* | 3/2014 | Chao .................... G06F 11/1469 713/167 |
| 2015/0127788 A1* | 5/2015 | Vittal ................. H04L 65/1069 709/221 |
| 2015/0134965 A1* | 5/2015 | Morenius ................ G06F 21/57 713/172 |
| 2015/0186668 A1* | 7/2015 | Whaley ............... G06F 21/6218 713/156 |
| 2015/0222637 A1 | 8/2015 | Hung |
| 2016/0014110 A1* | 1/2016 | Kurspahic ............... G06F 21/31 713/183 |
| 2016/0080374 A1* | 3/2016 | Kondoh .................. H04L 63/08 726/4 |
| 2016/0117673 A1* | 4/2016 | Landrok ............ G06Q 20/3829 705/71 |
| 2016/0285832 A1* | 9/2016 | Petrov ................. H04L 63/0428 713/171 |
| 2016/0352518 A1* | 12/2016 | Ford ................... G06F 12/1408 705/71 |
| 2017/0142082 A1* | 5/2017 | Qian ...................... G06F 21/62 713/171 |
| 2017/0178127 A1* | 6/2017 | Kravitz ............ G06Q 20/38215 705/71 |

* cited by examiner

100

200

300

400

450

500

600

750

700

800

900

1000

1100

1200

1300

1400

1500

SECURELY STORING AND DISTRIBUTING SENSITIVE DATA IN A CLOUD-BASED APPLICATION

CROSS REFERENCE TO OTHER APPLICATIONS

This application claims priority to U.S. Provisional Patent Application No. 62/293,437 entitled SECURELY STORING AND DISTRIBUTING SENSITIVE DATA IN A CLOUD-BASED APPLICATION filed Feb. 10, 2016 which is incorporated herein by reference for all purposes.

BACKGROUND OF THE INVENTION

In a "software as a service" (SaaS) or other cloud-based application or service, it is often necessary to securely distribute secrets to some entities/services within the SaaS system's cloud. It is also desirable to have a central management console/service and data repository where administrators can upload/configure and manage these secrets. It is sometimes challenging to securely store and distribute secrets stored on the system cloud because of vulnerabilities in the central management console, attempts to access secrets by entities for which the secret is not intended, and infiltration by third parties, among other things. Thus, there is a need to securely store and distribute sensitive data in a cloud-based application.

BRIEF DESCRIPTION OF THE DRAWINGS

Various embodiments of the invention are disclosed in the following detailed description and the accompanying drawings.

DETAILED DESCRIPTION

Figure 1:
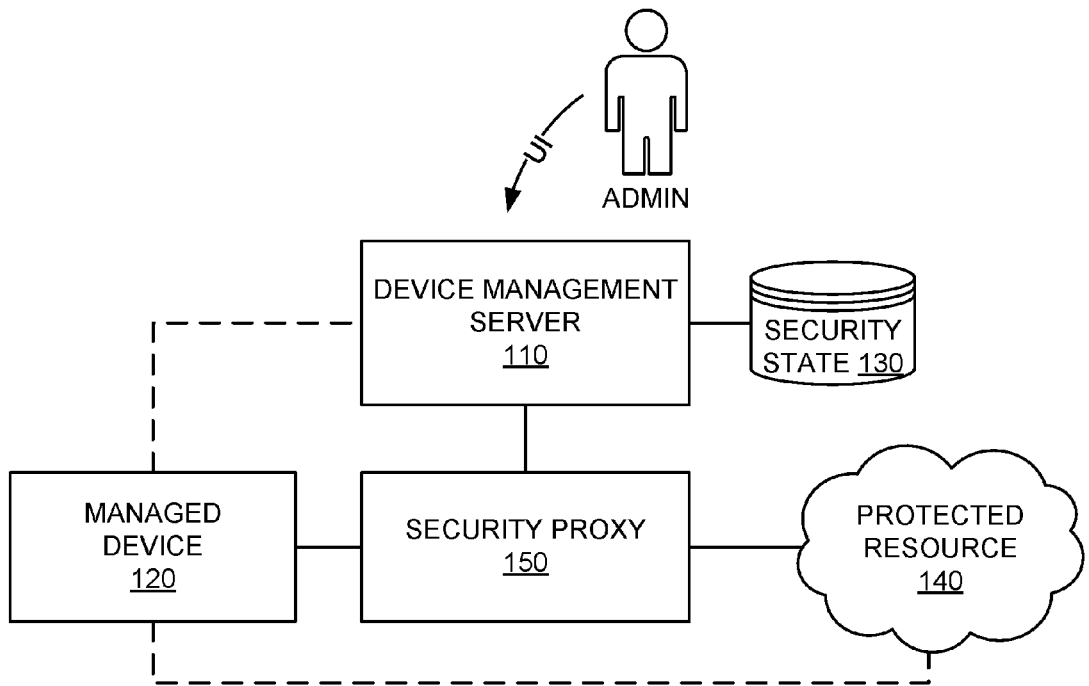
FIG. 1 is a block diagram illustrating an embodiment of a system to securely store and distribute data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Security of data stored in a cloud-based service (also called a "cloud management service" or "CMS") may be considered to be of high importance to the data owner. Unfortunately, the data can be subject to various vulnerabilities. An attacker who breaks into a CMS or data repository may be able to obtain the data. The attacker may be a malicious entity in the data owner's system/enterprise, in the CMS, or a third party (someone other than the cloud-based management service or the enterprise).

For example, customers of a cloud-based enterprise mobility management service may need to provide the CMS with certificates and associated private keys that can be used to sign SAML assertions. These assertions are accepted by other entities as proof of a user's identity and authorized actions. An attacker in possession of these private keys could masquerade as any user within an organization when authenticating to other cloud-based services such as an enterprise homepage or other business-critical applications. This could be potentially catastrophic for a customer as they could lose critical business data.

Cloud-providers, such as Amazon®, offer full-disk encryption of data repositories. This helps protect against attackers who gain access to a copy of the disk, usually a backup of the disk. Some databases, such as Microsoft® SQLServer and Oracle® offer "transparent data encryption" of data stored within the database. However, with either of these solutions, the system has access to the encryption keys. Thus, an attacker who gains access to the system via some exploit, such as SQL injection, can request the secrets directly from the database, which will return the unencrypted data. Furthermore, full-disk encryptions offers a relatively low level of access control.

In various embodiments, sensitive data, such as encryption keys, is stored in an encrypted form in the cloud, while ensuring that the cloud service does not store the keys needed to decrypt the sensitive data. In some embodiments, only administrators and/or authorized entities (such as security proxy servers or other entities associated with an enterprise, customer, tenant, domain, or other trusted entity) within the SaaS system can decrypt and recover the secrets. In some embodiments, security proxy servers may be added or removed without re-provisioning each of the other security proxy servers. In some embodiments, the CMS provides access control and key management and distribution. Examples of techniques to register a new security proxy server (e.g., MobileIron® Sentry), create a new profile, and assign a security proxy server to a profile in various embodiments are described here.

In various embodiments, one or more of the following advantages over existing solutions may be realized. Protected resources are available only to systems/entities designated by the customer administrators and this is enforced by strong cryptographic means. Existing solutions typically allow a Cloud Service Provider (CSP) to decrypt the data, but in this solution, in various embodiments, the CSP cannot (except, in some embodiments, for limited times under specific circumstances, as described herein) decrypt the data without taking extraordinary action, such as modifying the system to capture the administrator's plaintext password.

Security conscious users who entrust sensitive data to CSPs today can encrypt the data themselves before uploading. However, this is not a standardized process and therefore does not scale or interoperate. Thus, it is not suitable to a SaaS application or any other distributed system, as these environments require both scalability (e.g. more than one administrator, easy management of large numbers of keys, multiple systems within the environment, etc.) and interoperability. For instance, authorized entities within the distributed system must be able to decrypt data intended for them. Without an interoperable encryption process, this is not possible.

Unlike a manual system, the techniques described here can be seamlessly integrated into a SaaS application. Thus, all the key management and distribution is handled transparently to the administrator beyond the need for the administrator to provide credentials in order to complete a few operations.

Even existing solutions that encrypt data may use the same key for all entities accessing the data. They then need to rely on logical access controls (software limits access based on login information) to prevent one entity from accessing another's data. Unfortunately, there is a long history of logical access controls failing. The system described here uses cryptographically enforced separations as an additional (and stronger) form of access control.

In various embodiments, a transparent (to the user) system and method of securely storing and distributing data within a cloud-based system that offers comparable levels of security to users self-encrypting the data and managing the keys themselves is provided. In various embodiments, a process of retrieving secure data includes receiving a request, where the request includes a first secret data and a second secret data. The process further includes identifying a first encrypted data to retrieve based on the request, using the first secret data to decrypt the first encrypted data to generate a decrypted data, generating a second encrypted data, where the second encrypted data is encrypted using the second secret data. In response to the request, the second encrypted data is provided.

FIG. 1 is a block diagram illustrating an embodiment of a system 100 to securely store and distribute data. The system includes a device management server 110, a managed device 120, a security state storage 130, a protected resource 140, and a security proxy 150.

The device management server 110 provides management functionality with respect to one or more devices, such as the managed device 120. In the example shown, the device management server provides to device 120 secure access to protected resource 140. The device management server may be configured to configure the device 120 to be managed by the device management server and associated elements, such as security proxy 150. The device management server may be implemented by a mobile device management (MDM) server, an enterprise mobile management server (EMM), or the like.

The managed device 120 is a device that is usable by a user to access protected resource 140 via device management server 110. By way of non-limiting example, the managed device may be implemented by a physical device such as a smart phone, tablet, laptop, and/or smart wearable. The managed device may be registered with an enterprise system in order to access the protected resource 140. An example of a process to enroll a device is described in FIG. 8.

The security state storage 130 stores information about the security state of the system 100. For example, permission and profiles defining access permission of devices and/or administrators are stored in the security state storage. In response to a request for protected resources by the managed device, the device management server may determine whether the device has permission to access the requested protected resource and provide access via the security proxy accordingly.

The protected resource 140 includes enterprise backend content such as data stored by a cloud service provider. The protected resource 140 may include applications and services such as files, documents, email, calendar, contacts, and the like. Access to the protected resource may be managed by the device management server 110 and the security proxy 150. For example, some devices may have access to certain portions of the protected resource but not other portions as defined by the device's permission levels and/or profiles.

The security proxy 150 is configured to perform security and authentication procedures to secure communications between the managed device 120 and the protected resource 140. The security proxy can be implemented by a gateway that manages, encrypts, and secures traffic between the device and protected resources. For example, the device management server 110 may provide a trusted certificate (e.g., SSL) via the security proxy to authenticate the managed device 120 with the device management server. In various embodiments, the security proxy cooperates with a CMS (not shown) to store data, e.g., making the data a protected resource and/or to provide access to data in the protected resource.

In operation, an administrator can control the device management server 110 via a user interface. For example, an administrator may specify desired management functionalities and receive access analytics via the user interface. Techniques described here allow the administrator to use the user interface to securely store and distribute sensitive data. For example, an action specified by the administrator via the user interface may be automatically carried out to register a new security proxy server, create a new profile, and assign a security proxy server to a profile, as further described here.

A user of the managed device 120 can obtain secure access to enterprise backend applications and services 140 as follows. A user of the device 120 may enroll a device by logging in at device 120. As part of the enrollment process, a key pair may be generated for the device and the public key provided (via the security proxy) to the device. Device management server 110 uses configuration, device profile, user profile, and policy information in security state storage 130 to manage device 120 and provide secure access to protected resources 140. In various embodiments, the device management server 110 cooperates with a CMS to provide secure access to protected resources as further described with respect to FIG. 2.

In some embodiments, authentication keys (e.g., for an identity provider and/or a service provider) are securely stored as part of protected resource 140. The CMS provides key management and distribution. When a user requests an authentication key, the CMS provides the user with the key if the user has the appropriate permissions. An example of key distribution is described in FIG. 15.

Figure 2:
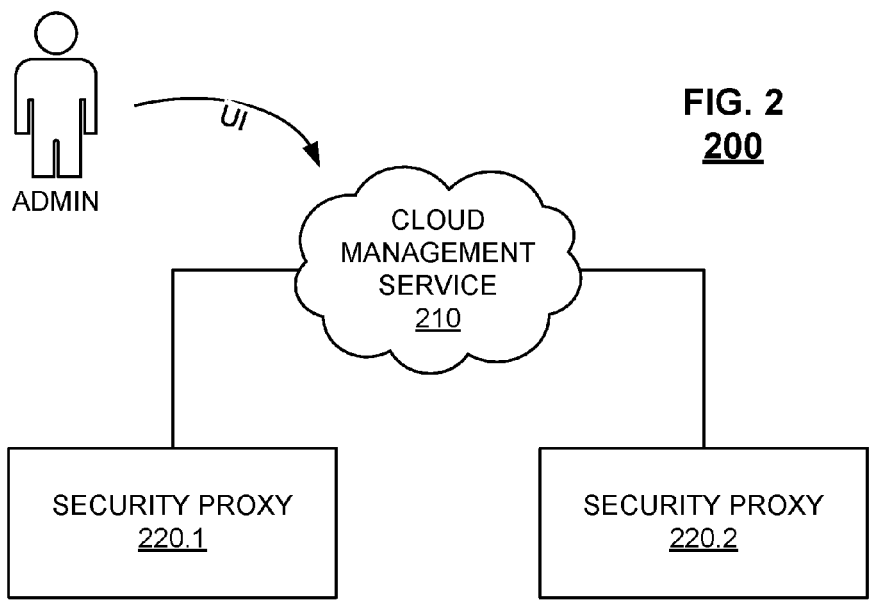
FIG. 2 is a block diagram illustrating an embodiment of a system to securely store and distribute data via one or more security proxies.

FIG. 2 is a block diagram illustrating an embodiment of a system 200 to securely store and distribute data via one or more security proxies. The system includes a cloud management service 210 and one or more security proxies 220.1 and 220.2.

The cloud management service 210 is configured to manage storage of data in the cloud. For example, the cloud management service is configured to store data provided by customers. In various embodiments, no passwords or private keys are stored in clear text within the CMS, regardless of whether full disk encryption or transparent database encryption is enabled.

In various embodiments, CMS accommodates multiple tenants. In various embodiments, legitimate credentials of one tenant do not allow access to another tenant's private keys. In some embodiments, this is achieved by preventing anyone who does not possesses the keys needed to decrypt the certificate private keys from accessing the protected resources. For example, if the tenant administrator and a security proxy server associated with the tenant are entities having the certificate private keys, then they are the only entities able to access the protected resource.

Each of the one or more security proxies 220.1 and 220.2 is configured to perform security and authentication procedures to secure communications between a managed device and protected resources, e.g., in cloud management service 210. In various embodiments, the security proxy is an instance owned and managed by a customer and may be provided on-premise or in the cloud. In some embodiments, a plurality of security proxy servers 220.1 and 220.2 may be deployed, and each may be configured (e.g., via one or more profiles) to support one or more of a plurality of separate data security domains (e.g. separate companies or other enterprises, tenants of a multi-tenant system, etc.)

Figure 12:
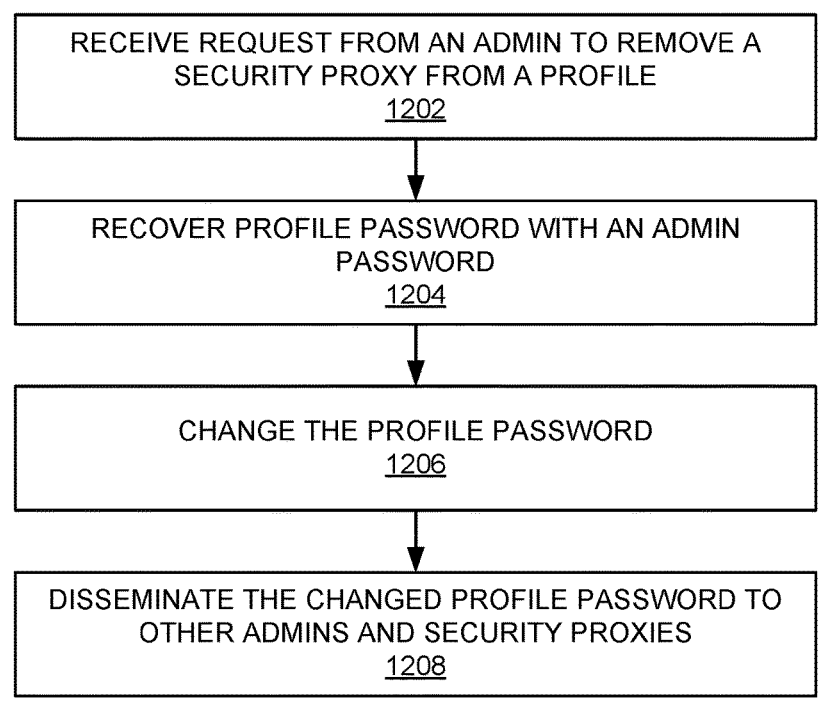
FIG. 12 is a flowchart illustrating an embodiment of a process to remove a security proxy from a profile for a secure storage and distribution system.

In various embodiments, a security proxy may be added or removed without re-provisioning each of the other security proxy servers as further described here, e.g., with respect to FIG. 12. In various embodiments, root-level access to a security proxy server (and thus recovery of the security proxy server's private key) does not compromise any certificates/private keys not included in the profile assigned to that security proxy server. An example is described with respect to FIGS. 7A and 7B. In various embodiments, a "profile" may comprise a set of settings and/or other configuration data for one or more security proxy servers.

In various embodiments, an administrator can make changes to CMS settings and content via an UI. In some embodiments, the administrator can authorize one or more security proxies to access data. For example, the administrator provides a password that is used to encrypt data as further described with respect to FIG. 3. Administrators are able to move a security proxy server from one profile to another (delete, add). An example process of adding a security proxy server to a profile is described with respect to FIG. 11. An example process of removing a security proxy server from a profile is described with respect to FIG. 12.

In operation, CMS 210 provides access to protected resources via security proxy 220.1 or 220.2. For example, CMS 210 uploads data to the cloud without storing the keys needed to decrypt the data. An example of data storage is described in FIG. 5. When a user with appropriate access permissions later requests the uploaded data, the CMS decrypts the requested data with an administrator-provided key, encrypts the decrypted data with the user's security proxy public key and provides the encrypted data. An example of data retrieval is described in FIG. 6.

The techniques described here can achieve various security goals. For example, root-level access to the CMS would not by itself give access to the customer private keys stored by the CMS. In one aspect, the techniques described here mitigate both threats from an adversary who hacks CMS and rogue employees.

In various embodiments, the integrity of the customer environment (e.g., protected resource 140 of FIG. 1) is protected. In one aspect, root-level access to a security proxy server (or knowledge of its private key) does not impact the security of other security proxy servers. Once a security proxy server has been removed by the CMS, knowledge of the security proxy server's private key does not allow an attacker to decrypt that profile's updated data in the database. In some embodiments, the security proxy server may have a copy of the data (e.g. profile and certificates/private keys), however if the database has been updated with new certificates then an attacker with access to the database cannot use the "revoked" public key of the security proxy server to decrypt that data. This advantageously limits damage done by a completely compromised security proxy server because after the security proxy server has been removed, the security proxy server is limited to access permitted by the most recent profile that it was able to decrypt.

Figure 3:
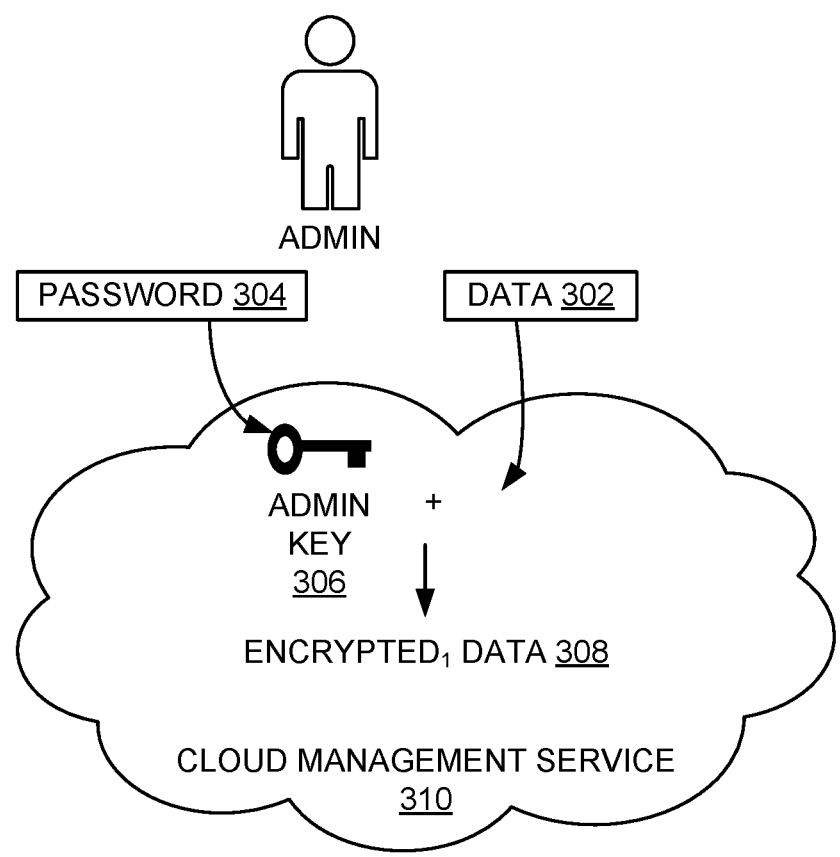
FIG. 3 is a block diagram illustrating an embodiment of a system to provide secure data storage to a cloud-based service.

FIG. 3 is a block diagram illustrating an embodiment of a system 300 to provide secure data storage to a cloud-based service. An administrator may securely store data 302 on cloud management service 310 as follows.

In some embodiments, when an administrator account is created, a public/private key pair is generated and protected with the administrator password 304. The admin public key 306 allows new profiles to be created without requiring the admin password. In some embodiments, a password that is different from the administrator's login password may be used, thus providing another layer of security.

To upload data to the CMS, the administrator provides the data to be uploaded and a password 304 such as a login password or another password. An administrator key 306 ("admin key") is recovered from the password provided by the administrator. The administrator key is used to encrypt the data 302 and the encrypted data 308 is stored in the CMS 310. In various embodiments, the administrator password is not retained by the CMS such that the encrypted data is not decryptable by the CMS or any entity other than the administrator.

Figure 15:
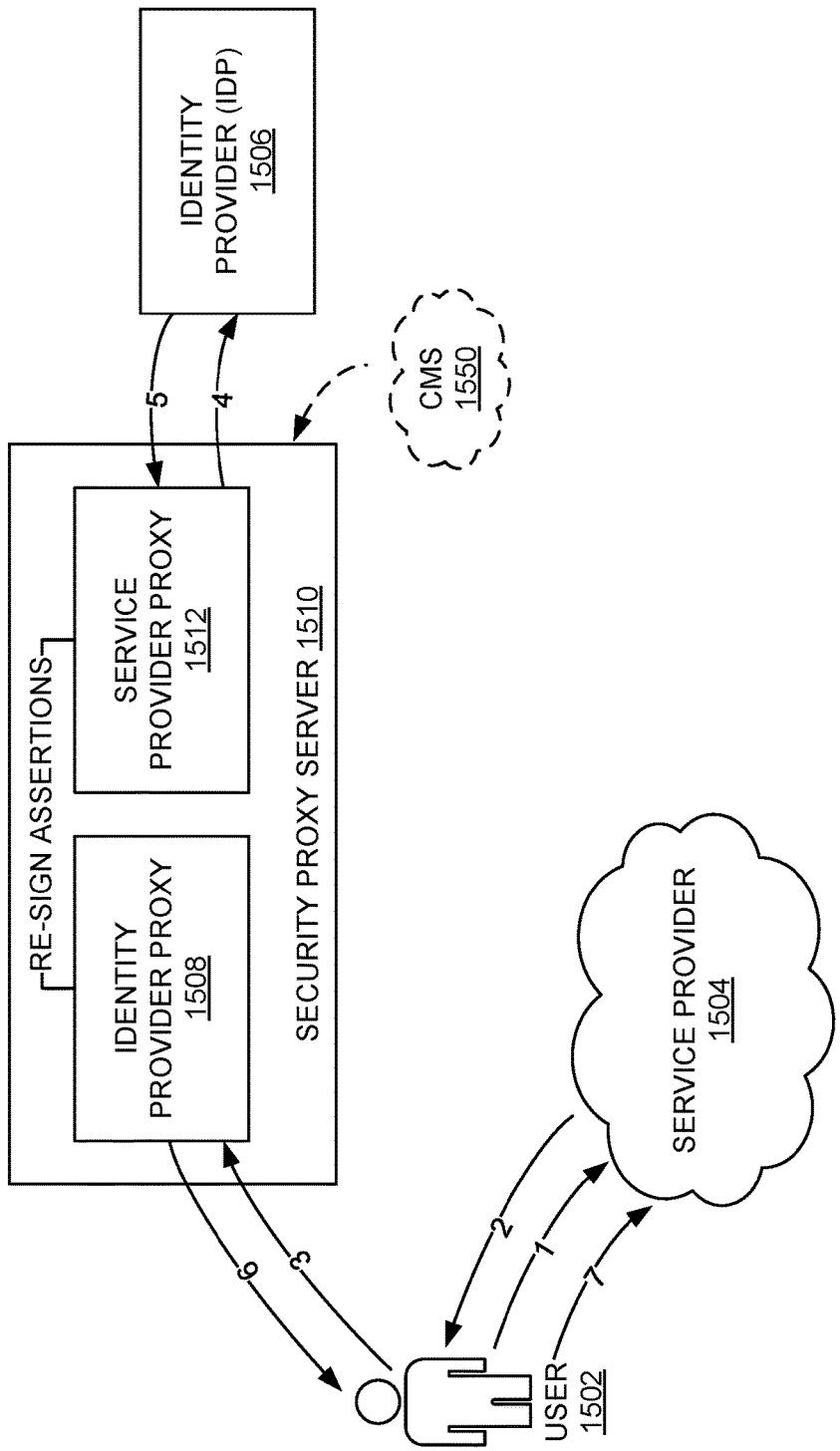
FIG. 15 block diagram illustrating an embodiment of a system to provide secure access to a cloud-based service via a delegated identity provider architecture and model.

The data uploaded by the administrator and held in the CMS 310 may be any type of data. In some embodiments, the data includes encryption keys to sign authentication requests. For example, the encryption keys may be used to sign authentication requests described in FIG. 15. Some of the messages shown in FIG. 15 are signed to cryptographically provide an identity of an origin, sender, or device to satisfy a requesting device.

Figure 4A:
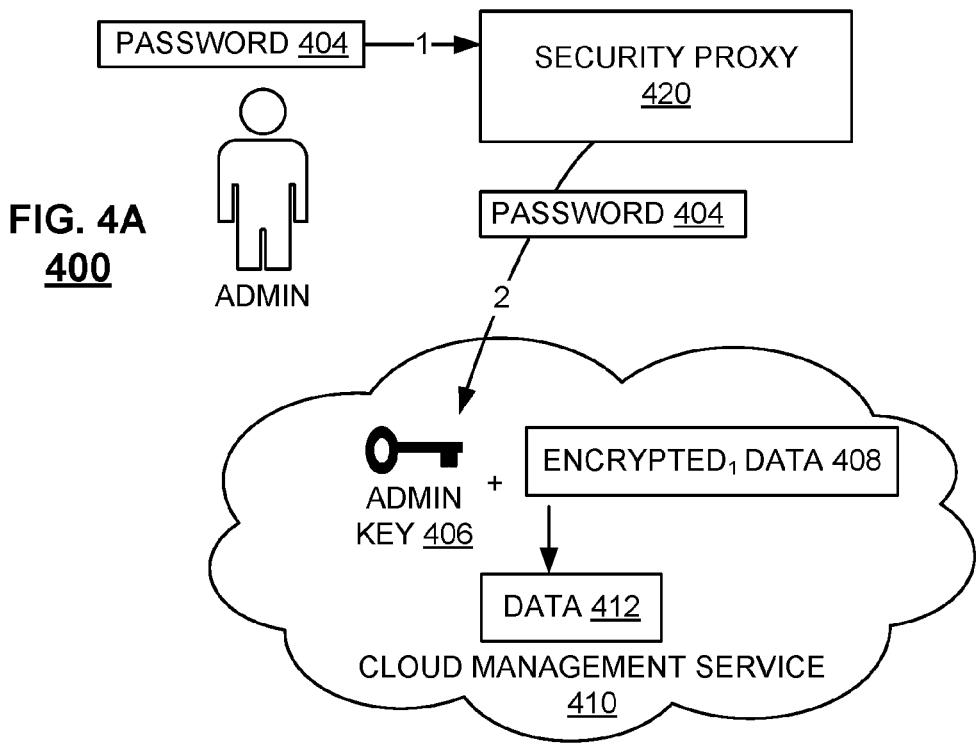
FIG. 4A is a block diagram illustrating an embodiment of a system to provide secure data retrieval from a cloud-based service.

FIG. 4A is a block diagram illustrating an embodiment of a system 400 to provide secure data retrieval from a cloud-based service. A user may retrieve data from cloud management service 410 via security proxy 420 as follows.

An administrator password 404 is provided via security proxy 420 to the CMS 410. In some embodiments, the administrator password is provided by a user requesting data or a lookup of the administrator password is triggered by the user's request. In some embodiments, the administrator password is provided by an administrator. An admin key 406 is recovered from the password provided by the administrator. The admin key can be used to decrypt the encrypted data 408. The encrypted data is momentarily decrypted in the CMS 410 in this state. In this state, the data 412 is not yet accessible by the user. The user accesses the data 412 according to FIG. 4B.

Figure 4B:
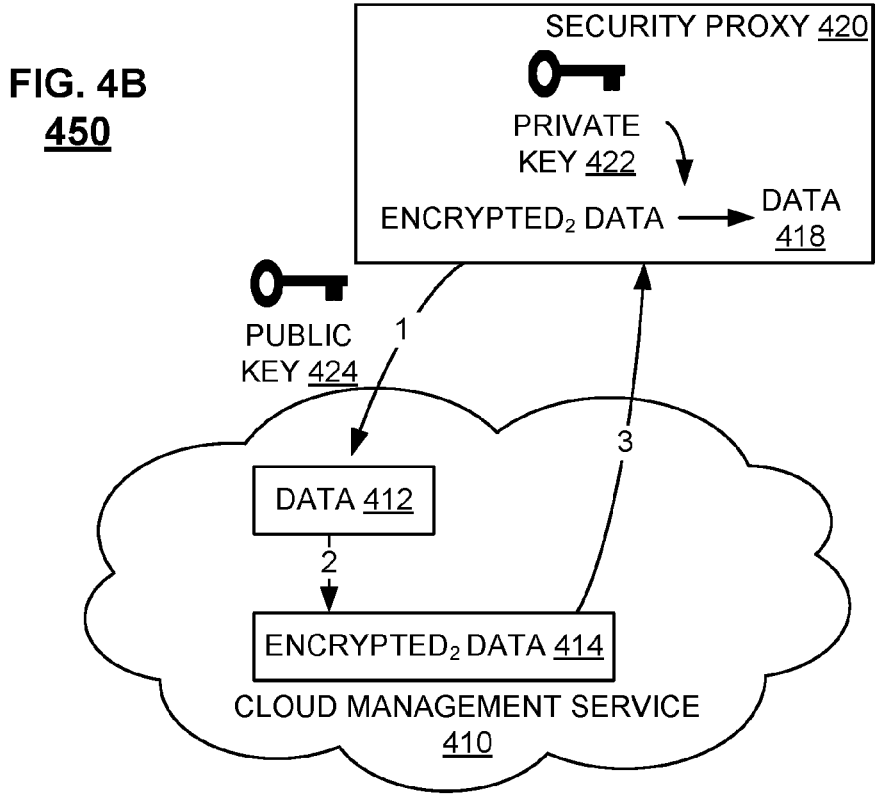
FIG. 4B is a block diagram illustrating an embodiment of a system to provide secure data retrieval from a cloud-based service.

FIG. 4B is a block diagram illustrating an embodiment of a system 450 to provide secure data retrieval from a cloud-based service. A user may retrieve data 418 from cloud management service 410 via security proxy 420 as follows.

The security proxy 420 provides its public key 424, which is used to encrypt the data 412. The data was previously decrypted with the admin key (shown in FIG. 4A). The data, which is now encrypted with the security proxy public key is provided by the CMS 410 to the security proxy 420. The security proxy server public key allows an administrator to add the security proxy server to the profile without knowing the security proxy server's private key. The security proxy 420 is able to decrypt the encrypted data 414 using its private key 422.

Various public keys discussed in FIGS. 3, 4A, 4B (e.g., admin, security proxy server, profile) provide trap-door functionality that allows new elements to be added without access to the private keys. This limits the number of times the administrator password is needed as well as helping to mitigate the impact of a potential breach of the CMS.

The techniques described here find application in a variety of systems. For example, these techniques may be used in any cloud structure having the ability to associate a service with a user account. The cloud structure may register systems (e.g., a mobile device, an application delivery system such as Citrix NetScaler®, etc.) and protect user data or authorized devices.

In some embodiments, an attacker with root-privileges for an extended period of time may still obtain sufficient customer credentials to access private keys. This may be a tradeoff made for usability. For example, the attacker is required to gain access to each customer's private keys one-by-one. The design described here, in various embodiments, mitigates the risk of a "mass-breach" of customer accounts.

Figure 5:
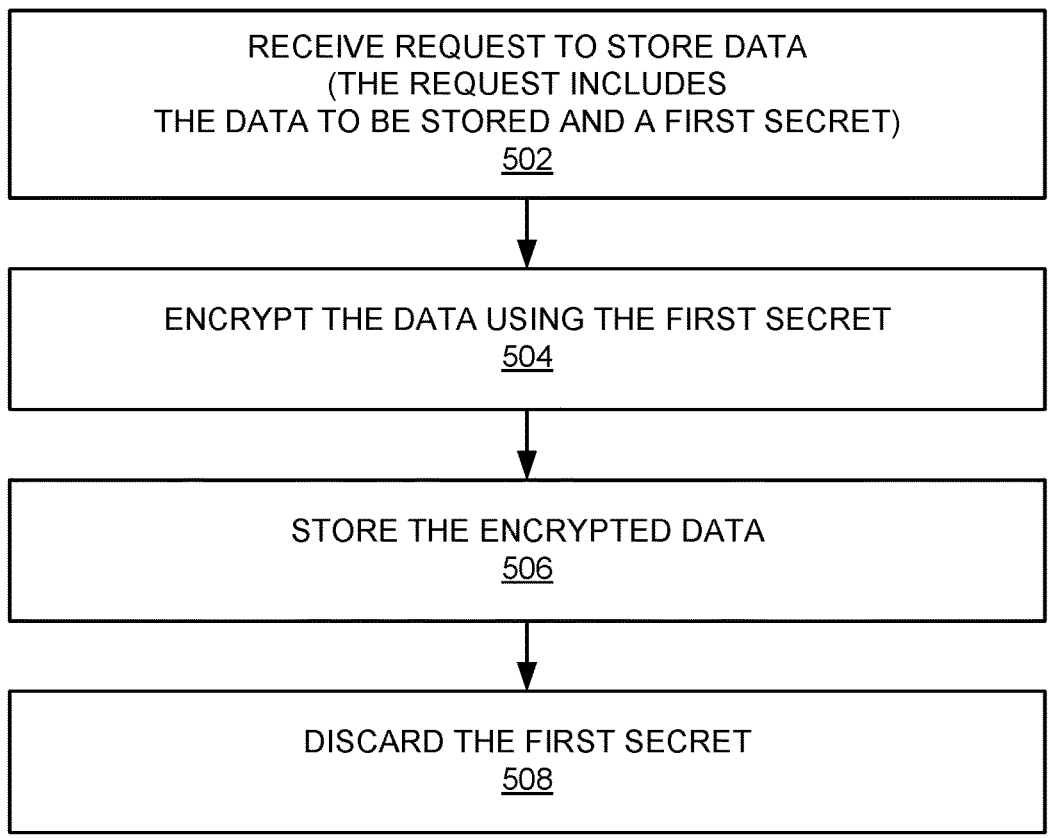
FIG. 5 is a flowchart illustrating an embodiment of a process to securely store data on a cloud management service.

FIG. 5 is a flowchart illustrating an embodiment of a process 500 to securely store data on a cloud management service. In various embodiments, the process 500 may be implemented by a cloud management service such as CMS 210 of FIG. 2, CMS 310 of FIG. 3, or CMS 410 of FIGS. 4A and 4B.

A request to store data is received (502). In various embodiments, the request includes the data to be stored and a first secret. The first secret may be an admin password that protects an admin key. The data is encrypted using the first secret (504). For example, the first secret is used to recover an admin key. The admin key is used to encrypt the received data. The encrypted data is stored (506) and the first secret is discarded (508). Because the first secret and the admin key recovered from the first secret are not retained, the encrypted data is securely stored and cannot be decrypted by the storage system. Only administrators and/or authorized entities (such as security proxy servers or other entities associated with an enterprise, customer, tenant, domain, or other trusted entity) can decrypt and recover the secrets.

Figure 6:
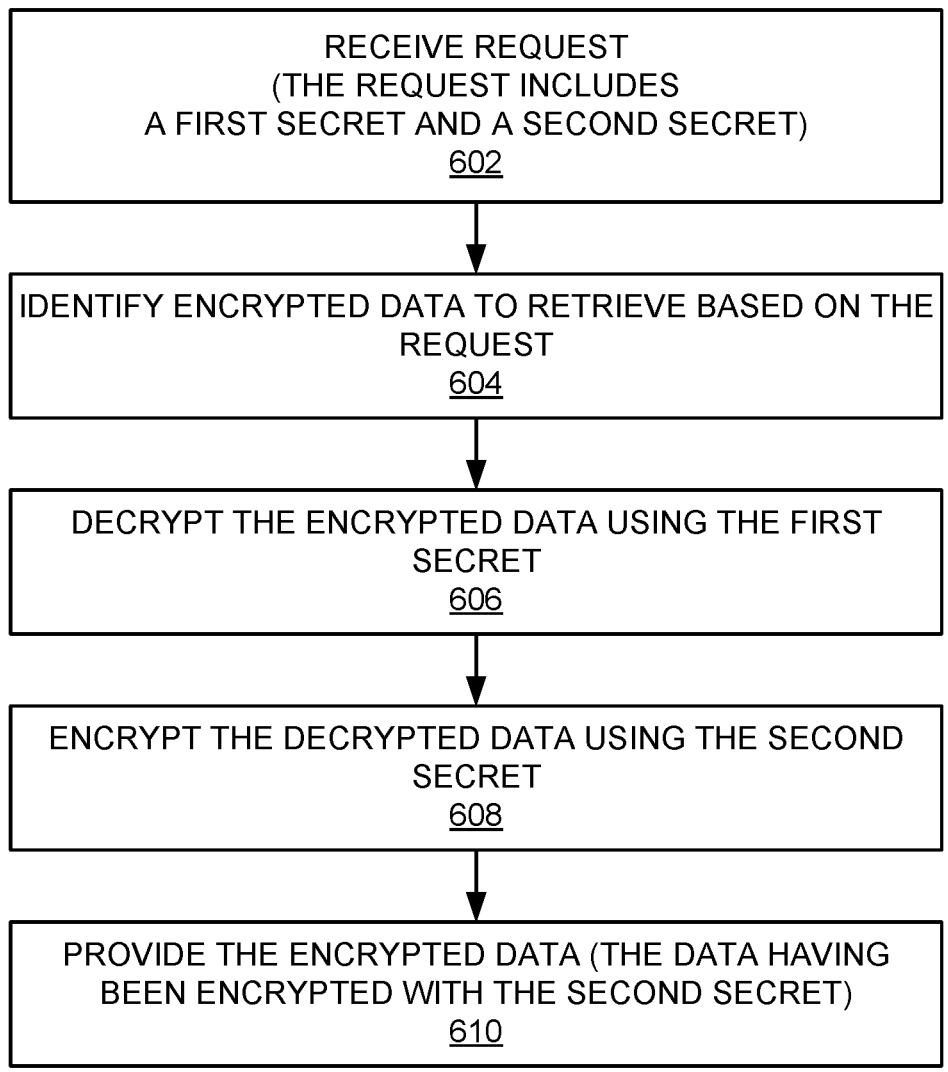
FIG. 6 is a flowchart illustrating an embodiment of a process to securely retrieve data from a cloud management service.

FIG. 6 is a flowchart illustrating an embodiment of a process 600 to securely retrieve data from a cloud management service. In various embodiments, the process 600 may be implemented by a cloud management service such as CMS 210 of FIG. 2, CMS 310 of FIG. 3, or CMS 410 of FIGS. 4A and 4B.

A request is received (602). In various embodiments, the request includes a first secret and a second secret. The first secret may be an admin password that protects an admin key. The second secret may be a security proxy public key. The security proxy public key may be part of a key pair assigned to the security proxy at enrollment, e.g., as described with respect to FIG. 10. The security proxy public key may be used to encrypt data sent to the security proxy such as the requested data from the CMS. The request may be for access to data stored in a CMS. In various embodiments, the data was stored in the CMS according to process 500 of FIG. 5. Based on the request, encrypted data to retrieve is identified (604). For example, the CMS determines whether the requestor has the appropriate permissions or privileges to access the requested data. The encrypted data is decrypted using the first secret (606). For example, the first secret is used to recover an admin key. The admin key is used to decrypt the encrypted data.

To send the data, which has been decrypted by the admin key, to the requestor in encrypted form, the decrypted data is encrypted using the second secret (608). For example, a security proxy public key is used to encrypt the data. The encrypted data is provided (610). Upon receipt, the security proxy may use its private key to decrypt the encrypted data.

Figure 7B:
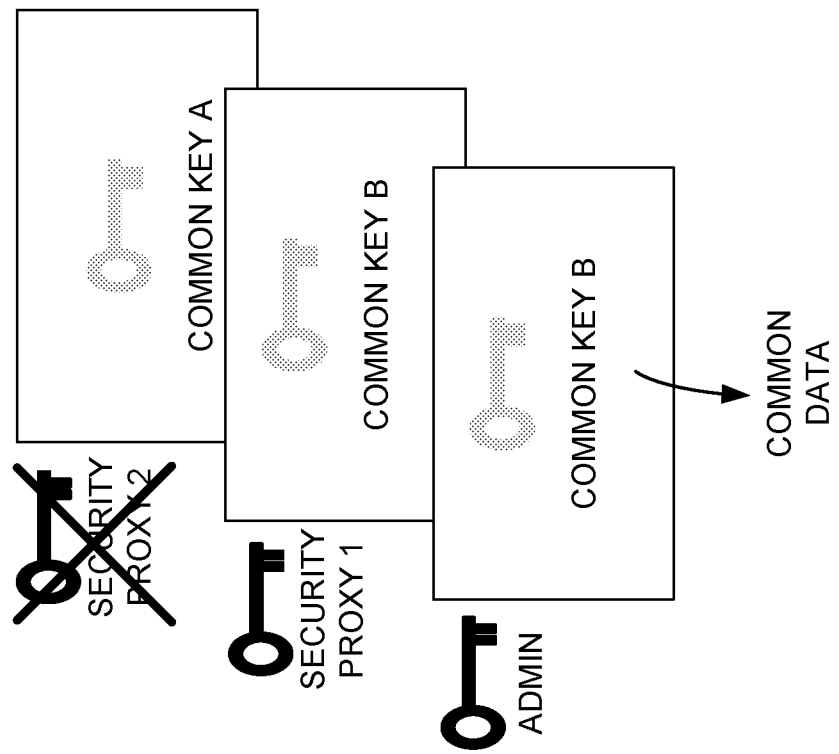
FIG. 7B is a block diagram of a system to provide secure access to a cloud-based service using one or more encryption keys.
Figure 7A:
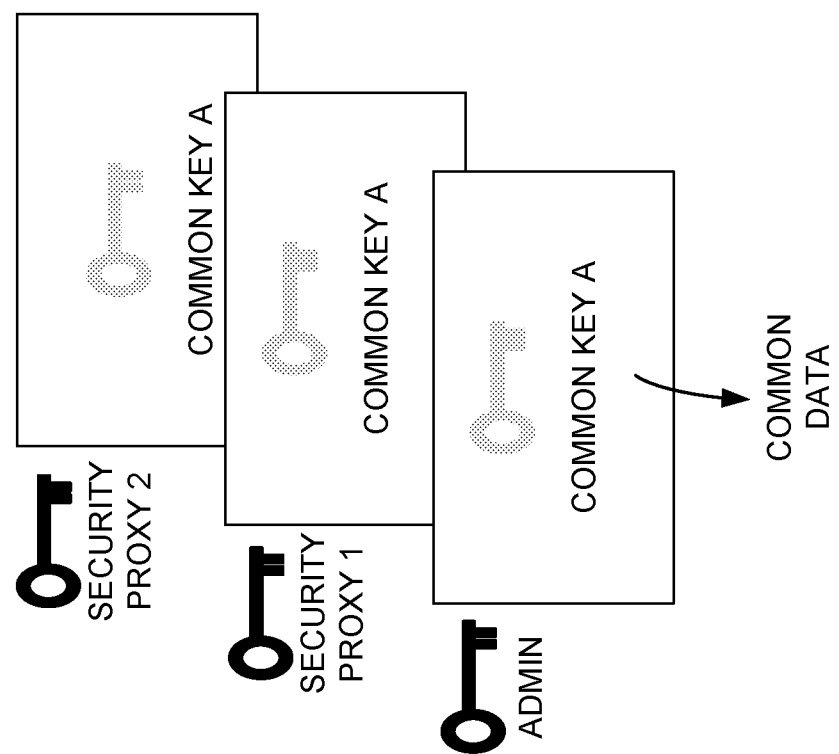
FIG. 7A is a block diagram of a system to provide secure access to a cloud-based service using one or more encryption keys.

FIG. 7A is a block diagram of a system 700 to provide secure access to a cloud-based service using one or more encryption keys. The system 700 shows a key hierarchy and secure key storage mechanism.

In system 700, security proxies "security proxy 1" and "security proxy 2" are joined to a profile. The security proxies that are joined to the profiled have a key to access the common key. In this example, security proxy 1 and security proxy 2 have been joined to a profile and each has a key. The common data may include a variety of data. In some embodiments, the common data includes a key to sign requests such as the request shown in FIG. 15 and a key to prove a sentry's identity to devices connecting to the sentry. Compared with conventional data storage systems, system 700 has enhanced security features. For example, the same common data is encrypted by a common key, the encrypted with a respective one of the admin key, first security proxy key, and second security proxy key. The common public key allows the CMS to access common data without knowledge of the common private key. For example, a profile public key (a type of common public key) allows the CMS to add new certificates to the profile without knowledge of the profile's private key. Thus, the CMS will not need the administrator's password to perform this action.

In some embodiments, the common key is encrypted by an admin public key and security proxy public keys. In the example shown here, the common key is encrypted by the admin key and security proxy 1 key and security proxy 2 key. The common key encrypts common data. When a security proxy requests access to the common data, the security proxy is able to obtain access to the common data using its public key, which has been used to encrypt the common key. In this manner, the security proxy can use its private key to decrypt the common key.

Using the key hierarchy of FIG. 7A, it is also possible to add/remove administrators and support multiple administrators. If an administrator forgets their password, reset by another administrator is possible. In some embodiments, if all administrators for a tenant forget their passwords simultaneously, the tenant will basically no longer be able to add security proxy servers to/remove from profiles. In some embodiments, there is a recovery path via registered security proxy servers, since they possess the requisite encryption keys.

FIG. 7B is a block diagram of a system 750 to provide secure access to a cloud-based service using one or more encryption keys. In this example, security proxy 2 no longer has access to the system. When a common key is replaced, the common key is distributed to entities with permission to access the common key and encrypted with the public key for the allowed entities. Thus, once a common key is replaced, an entity that does not have the common key is unable to access the common data. Here, common key A is replaced with common key B. Because security proxy 2 does not have common key B, security proxy 2 is unable to access common data.

The "passwords," in various embodiments, aside from the admin password, may be BASE64 encoded encryption keys. As such, they may need to be sufficiently large (128 or 256 bits) to serve the purpose. This will make them as strong as the underlying RSA keys.

Figure 8:
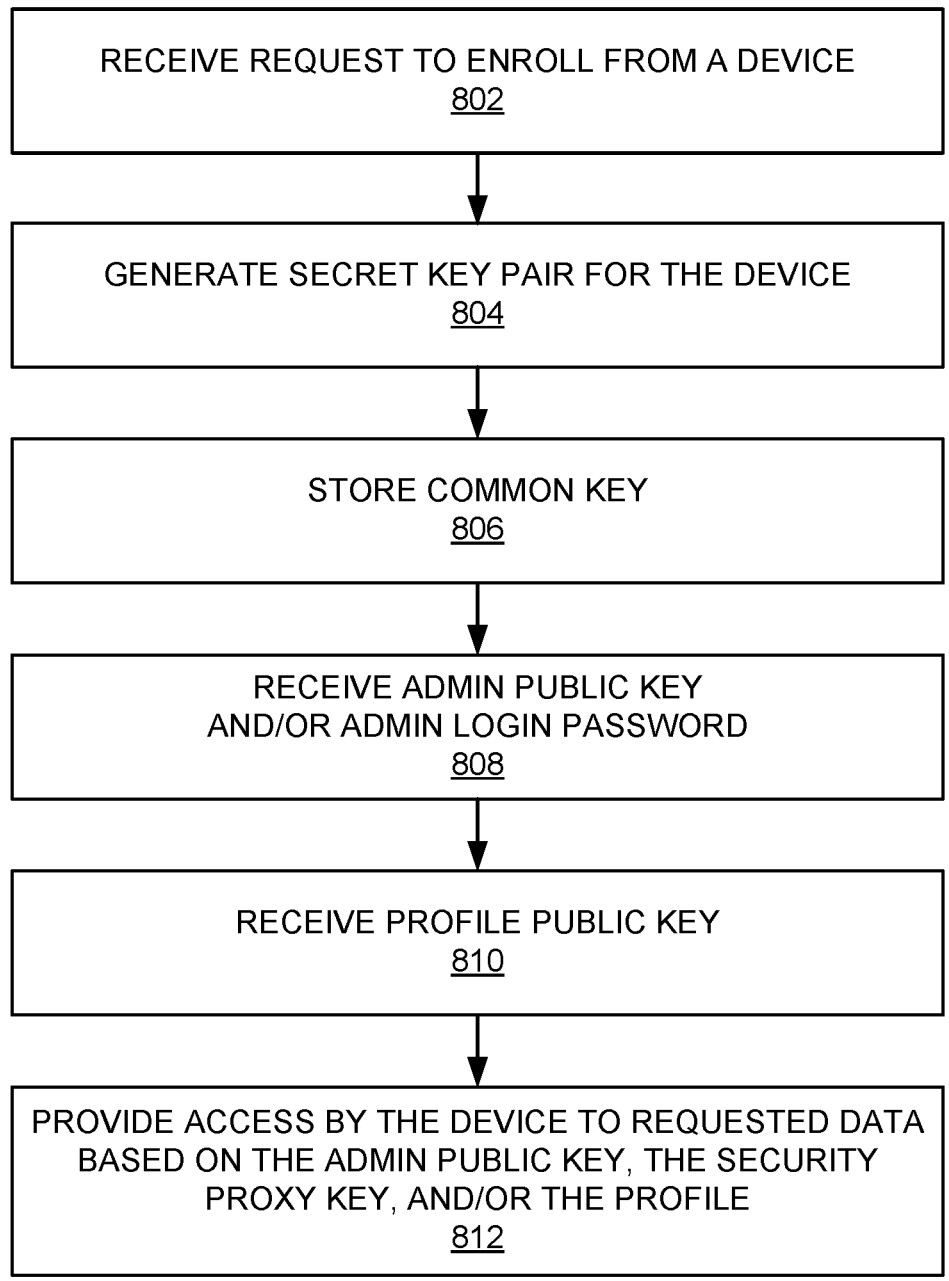
FIG. 8 is a flowchart illustrating an embodiment of a process to enroll a device in a secure storage and distribution system.

FIG. 8 is a flowchart illustrating an embodiment of a process 800 to enroll a device in a secure storage and distribution system. In various embodiments, the process 800 may be implemented by a security proxy such as security proxy 220.1 and 220.2 of FIG. 2 or security proxy 420 of FIGS. 4A and 4B.

In some embodiments, the process 800 of enrolling a device into an enterprise system designates that a security proxy belongs to a particular tenant. A request to enroll is received from a device (802). A secret key pair is generated for the device (804). The secret key pair may be an RSA key pair, e.g., 3072 bit. A public key is stored (806). For example, the public key is uploaded to CMS for future use. An admin public key and/or admin login password is received (808). The admin public key and/or login password may be that of an admin managing the device. A common public key is received (810). For example, the common public key is a profile public key for encrypting common or profile data. Upon successful enrollment, access to requested data is provided based on the admin public key, the security proxy key, and/or the profile (812). The profile may include identifying information about the device such as an associated admin, tenant, etc. Processes 500 and 600 of FIGS. 5 and 6 are examples of providing access to the requested data based on the admin public key, the security proxy key, and/or the profile.

Figure 9:
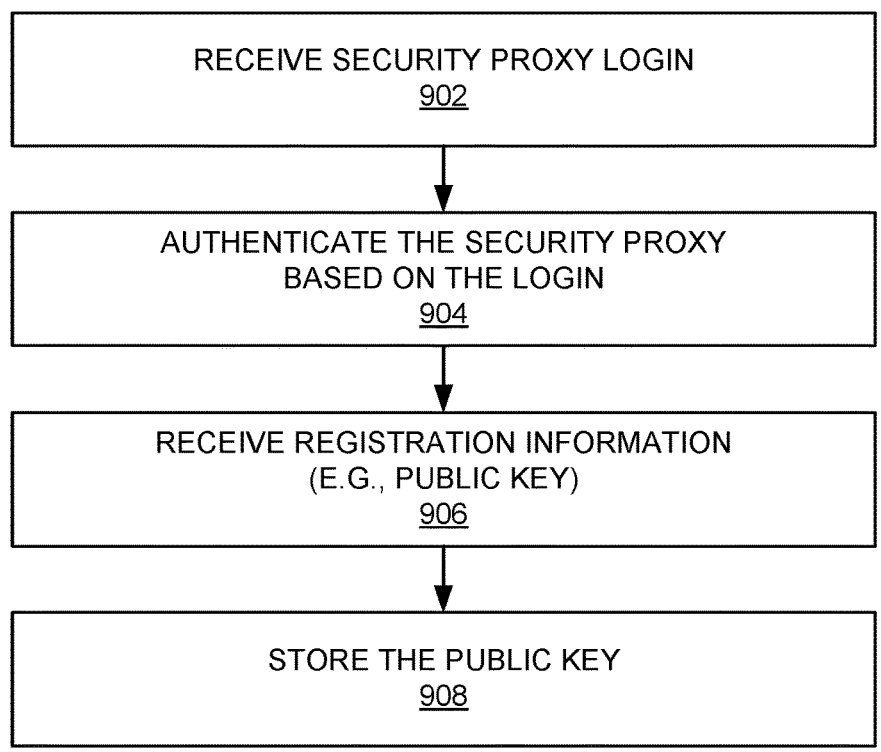
FIG. 9 is a flowchart illustrating an embodiment of a process to register a security proxy in a secure storage and distribution system.

FIG. 9 is a flowchart illustrating an embodiment of a process 900 to register a security proxy in a secure storage and distribution system. In various embodiments, the process 900 may be implemented by a cloud management service such as CMS 210 of FIG. 2, CMS 310 of FIG. 3, or CMS 410 of FIGS. 4A and 4B with respect to a security proxy such as security proxy 220.1 and 220.2 of FIG. 2 or security proxy 420 of FIGS. 4A and 4B.

A security proxy login is received (902). The login may include an administrator password, sentry password, and profile/tenant. In various embodiments, login information provided by the security proxy is used to verify that the security proxy is authorized and not rogue. The security proxy is authenticated based on the login (904). For example, the privileges of the security may be looked up in a security state database such as security state database 130 of FIG. 1. Registration information is received (906). In some embodiments, the registration information includes a security proxy public key. The public key is stored (908). Upon the completion of registration, the security proxy belongs to a tenant. In various embodiments, the public key is used later when a user requests data stored in a CMS via the security proxy, e.g., process 600 of FIG. 6.

Process 900 improves usability compared with typical processes because administrators do not need to access each security proxy server individually after initial registration with the CMS.

Figure 10:
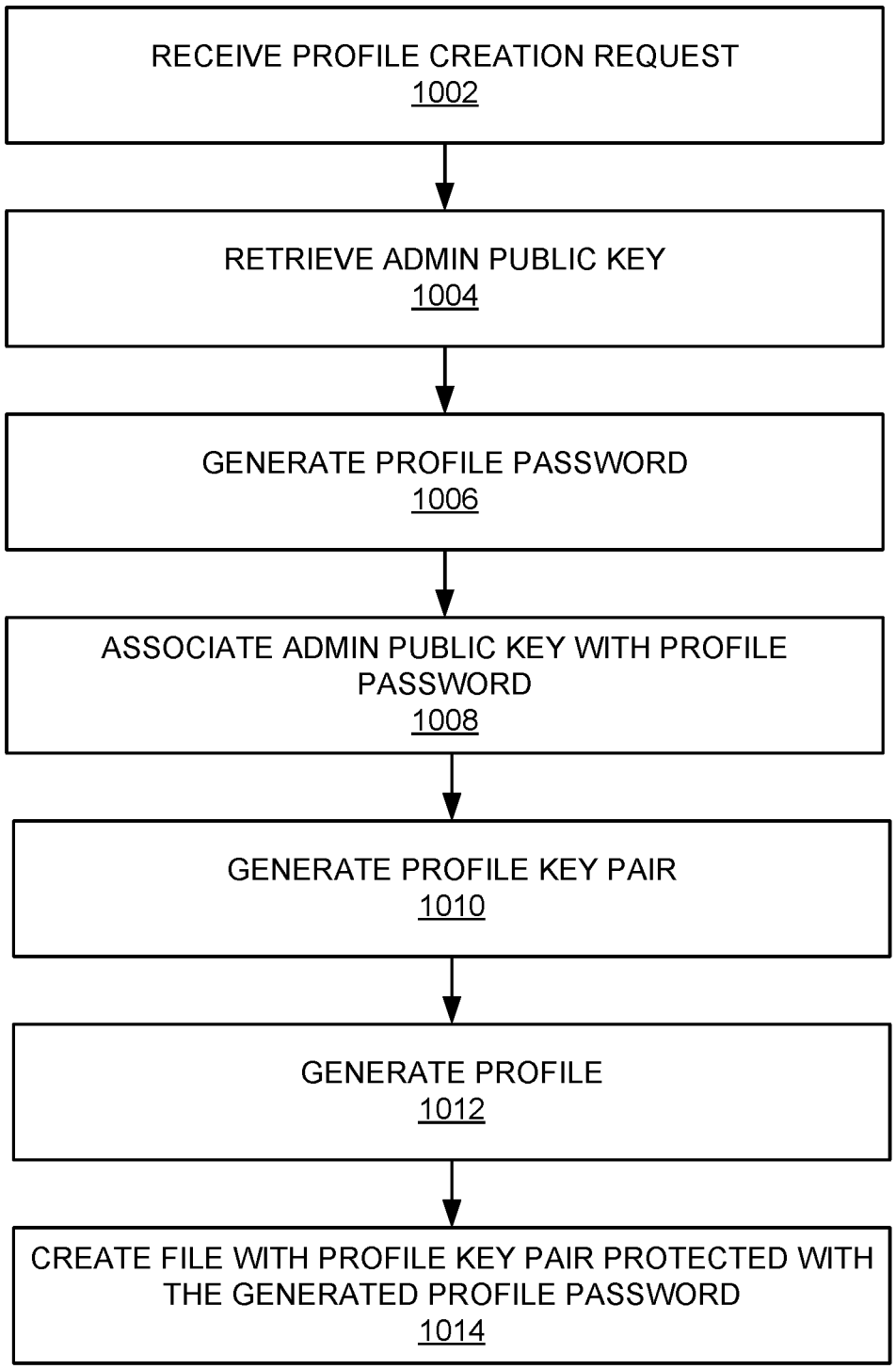
FIG. 10 is a flowchart illustrating an embodiment of a process to create a new profile for accessing a secure storage and distribution system.

FIG. 10 is a flowchart illustrating an embodiment of a process 1000 to create a new profile for accessing a secure storage and distribution system. In various embodiments, the process 1000 may be implemented by a cloud management service such as CMS 210 of FIG. 2, CMS 310 of FIG. 3, or CMS 410 of FIGS. 4A and 4B.

In various embodiments, a profile defines access permission of devices and/or administrators. After creating a profile, security proxies may be joined to the profile. In the example of FIG. 7A, the profile is common data and security proxy 1 and security proxy 2 have been joined to the profile such that they can access the common data.

Returning to FIG. 10, a profile creation request is received (1002). An admin public key is retrieved (1004) and a profile password is generated (1006). The admin public key is associated with a profile password (1008). For example, the admin public key encrypts a profile password. A profile key pair is generated (1010). When a new profile is created, CMS will generate a new public/private key pair for that profile. For example, the profile key pair is a common data key pair for accessing common data of FIG. 7A. A profile is generated (1012). A file with the profile key pair is created and protected with the generated profile password (1014).

Figure 11:
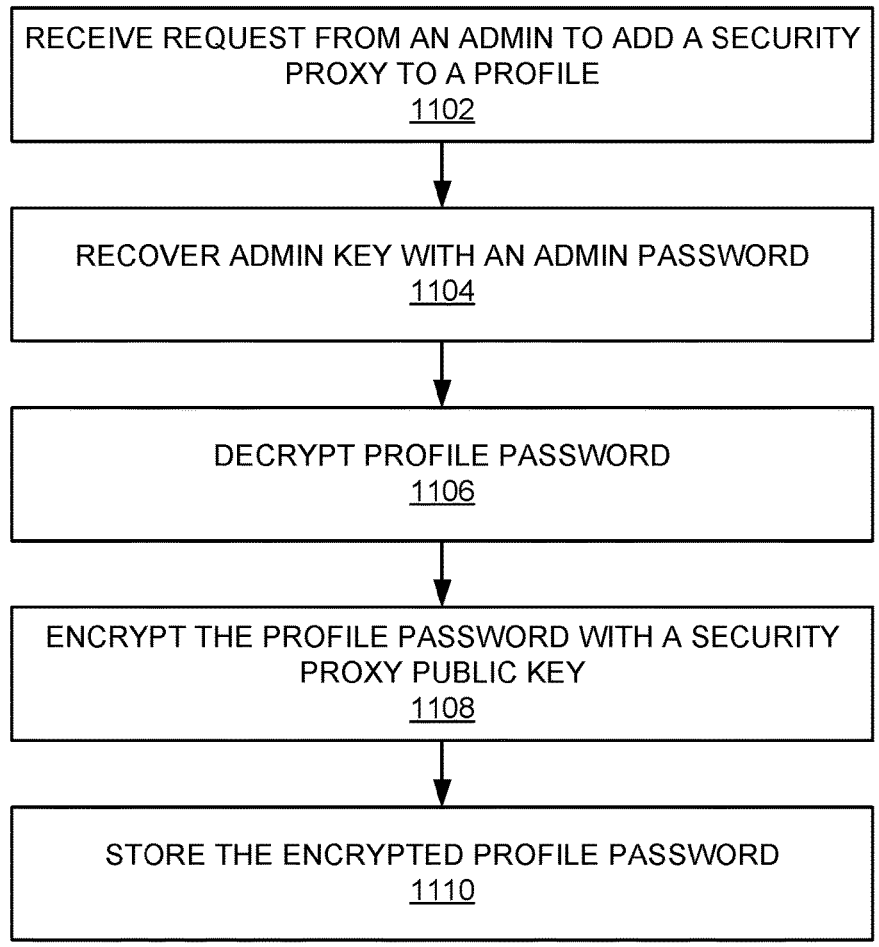
FIG. 11 is a flowchart illustrating an embodiment of a process to assign a security proxy to a profile for accessing a secure storage and distribution system.

FIG. 11 is a flowchart illustrating an embodiment of a process 1100 to assign a security proxy to a profile for accessing a secure storage and distribution system. In various embodiments, the process 900 may be implemented by a cloud management service such as CMS 210 of FIG. 2, CMS 310 of FIG. 3, or CMS 410 of FIGS. 4A and 4B with respect to a security proxy such as security proxy 220.1 and 220.2 of FIG. 2 or security proxy 420 of FIGS. 4A and 4B.

A request from an admin to add a security proxy to a profile is received (1102). An admin key is recovered with an admin password (1104). A profile password is decrypted (1106). The profile password is encrypted with a security proxy public key (1108). The encrypted profile password is stored (1110). Once a security proxy is assigned to a profile, the security proxy obtains the profile key by decrypting the profile password and using the profile password to decrypt the profile key. For example, the profile password unlocks the profile public and private keys, and the profile public and private keys encrypt common data.

FIG. 12 is a flowchart illustrating an embodiment of a process 1200 to remove a security proxy from a profile for a secure storage and distribution system. In various embodiments, the process 900 may be implemented by a cloud management service such as CMS 210 of FIG. 2, CMS 310 of FIG. 3, or CMS 410 of FIGS. 4A and 4B with respect to a security proxy such as security proxy 220.1 and 220.2 of FIG. 2 or security proxy 420 of FIGS. 4A and 4B.

A request from an admin to remove a security proxy from a profile is received (1202). A profile password is recovered with an admin password (1204). The profile password is changed (1206). The changed profile password is disseminated to other admins and security proxies (1208). In one aspect, the profile password is being encrypted for the other admins and security proxies but not the security proxy that was removed. The security proxy that was removed does not have the changed profile password and is thus unable to obtain profile data with its old password.

Referring to FIGS. 7A and 7B, the system 750 may result from applying process 1200 to system 700. In FIG. 7B, security proxy 2 has been removed and common key A (e.g., profile password) has been changed to common key B.

Figure 13:
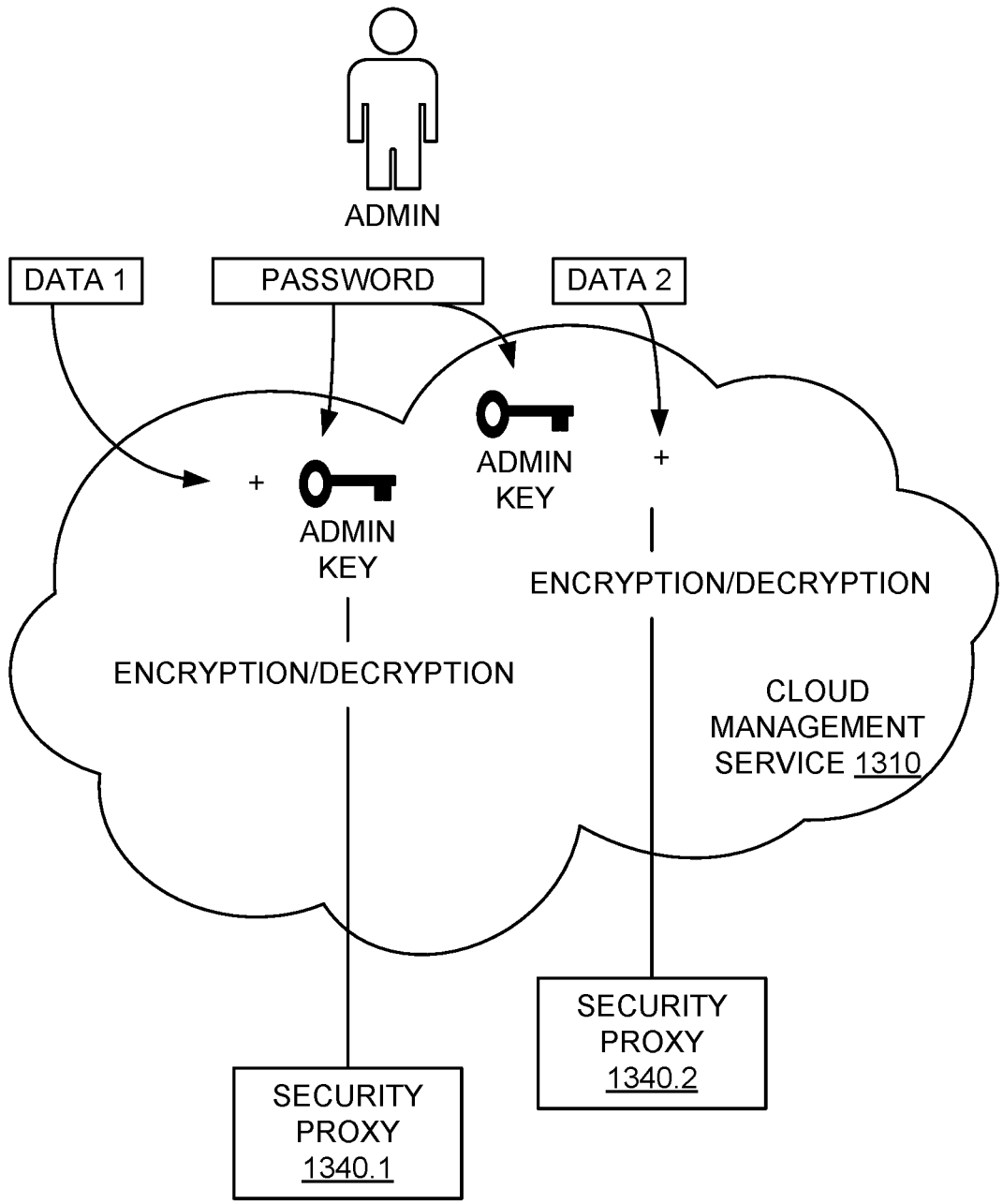
FIG. 13 is a block diagram illustrating an embodiment of a system provide secure access to a cloud-based service via a plurality of security proxies.

FIG. 13 is a block diagram illustrating an embodiment of a system 1300 provide secure access to a cloud-based service via a plurality of security proxies. The system 1300 includes a plurality of security proxies 1340.1 and 1340.2. In this example, a single administrator manages multiple security proxies. For example, different devices within an enterprise network may have different access permissions. Each device has a respective security proxy for accessing enterprise resources. A single administrator may manage a number of different security proxies.

In operation, to upload first data ("Data 1") for security proxy 1340.1, the administrator provides a password. An administrator key is recovered from the password and used to encrypt the first data. The first data may be uploaded/downloaded by the security proxy 1340.1 according to the techniques described here, e.g., FIGS. 5 and 6. To upload second data ("Data 2") for security proxy 1340.2, the administrator provides its password (the same password that was provided for Data 1). An administrator key is recovered from the password and used to encrypt the second data. The second data may be uploaded/downloaded by the security proxy 1340.2 according to the techniques described here, e.g., FIGS. 5 and 6.

Distributing and storing certificates and other sensitive data in the cloud, but with each certificate, key or sensitive data being encrypted using a key only available (except for limited times and circumstances, as described here) to an owner and/or administrator of that data and/or another entity trusted by the data owner, enables the convenience of cloud-based storage of such sensitive data to be achieved without exposing the sensitive data of one data owner to that of another, and without exposing the sensitive data of all to exposure in the event of security breach with respect to just one.

Figure 14:
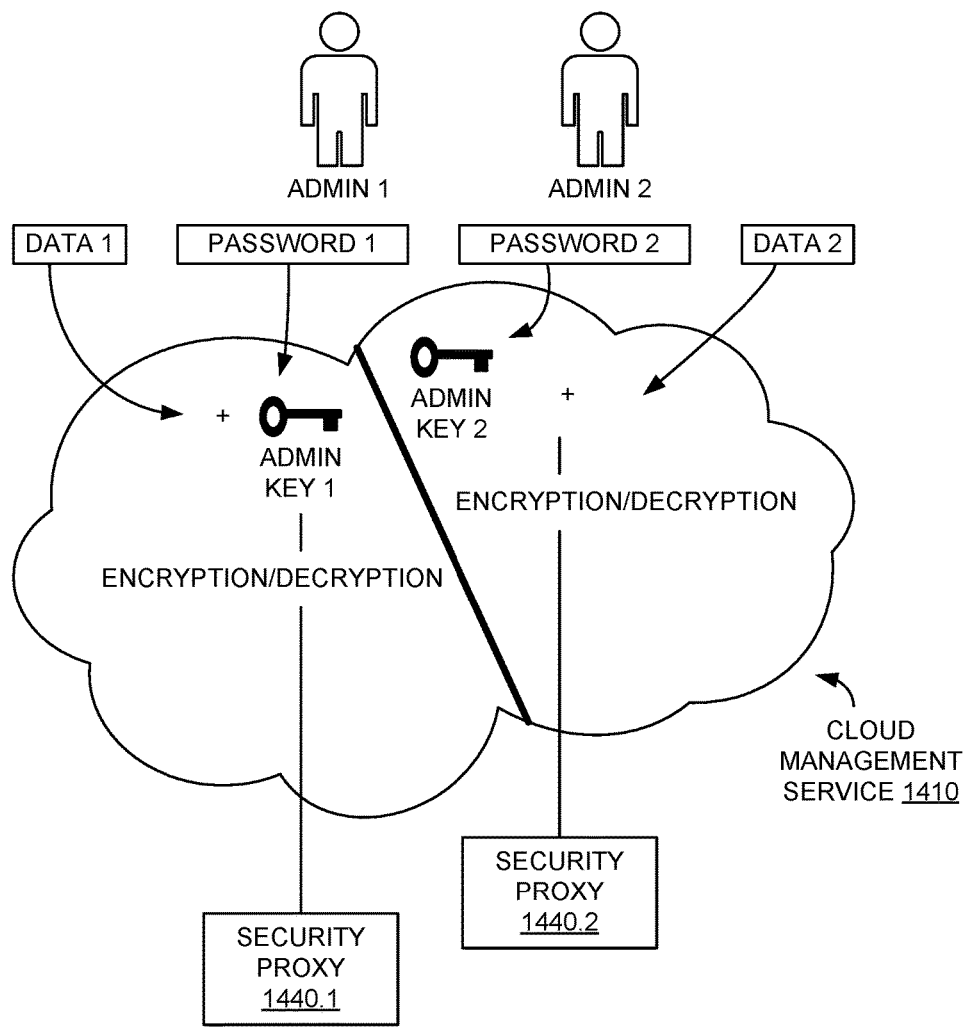
FIG. 14 is a block diagram illustrating an embodiment of a system to provide secure access by a plurality of administrators to a cloud-based service.

FIG. 14 is a block diagram illustrating an embodiment of a system 1400 to provide secure access by a plurality of administrators to a cloud-based service. The system 1400 includes a plurality of administrators ("Admin 1" and "Admin 2") and a plurality of security proxies 1440.1 and 1440.2. In this example, data for several administrators/tenants are maintained in the same cloud. Data belonging to a tenant is only accessible by that tenant and not other tenants.

In operation, to upload first data ("Data 1") for security proxy 1440.1, Admin 1 provides a first password, "Password 1". A first administrator key is recovered from the first password and used to encrypt the first data. The first data may be uploaded/downloaded by the security proxy 1440.1 according to the techniques described here, e.g., FIGS. 5 and 6. To upload second data ("Data 2") for security proxy 1440.2, the administrator provides a second password, "Password 2." A second administrator key is recovered from the second password and used to encrypt the second data. The second data may be uploaded/downloaded by the security proxy 1440.2 according to the techniques described here, e.g., FIGS. 5 and 6.

FIG. 15 block diagram illustrating an embodiment of a system 1500 to provide secure access to a cloud-based service via a delegated identity provider architecture and model. The techniques described herein may be applied to the system 1500. For example, various encryption keys described below may be obtained from a CMS using processes 500 and 600 of FIGS. 5 and 6.

In the example shown, the system and environment 1500 includes one or more user agents, represented in FIG. 15 by user agent 1502, e.g., without limitation, a browser, managed app, unmanaged app, or other software running on a mobile or other device, configured to be used to access a cloud-based service provided by a service provider 1504, e.g., Box.com™ Dropbox®, or Salesforce.com®. User agent 102 is associated with an identity provider 106, e.g., an on-premises, cloud-based, or other identity provider, such as the PingOne® service offered by Ping Identity Corporation. In the example shown, a trust relationship has been established between service provider 1504 and identity provider proxy 1508 running on security proxy server 1510. For example, service provider 1504 and identity provider proxy 1508 may have exchanged certificates. Similarly, a trust relationship has been established between identity provider 1506 and service provider proxy 1512, e.g., via exchange of certificates.

Identity provider proxy 1508 and service provider proxy 1512 have a trust relationship established between them and each has been configured to re-sign assertions on behalf of the other. For example, in various embodiments, identity provider proxy 1508 is configured to provide to service provider 1504 and/or user agent 1502 (e.g., for further presentation to and consumption by identity provider 1506) assertions signed by identity provider proxy 1508 on behalf of (i.e., acting and appearing as) service provider proxy 1512. Similarly, in various embodiments, service provider proxy 1512 is configured to provide to identity provider 1506 and/or user agent 1502 (e.g., for further presentation to and consumption by service provider 1504) assertions signed by service provider proxy 1512 on behalf of (i.e., acting and appearing as) identity provider proxy 1508.

In various embodiments, user agent 1502 may initiate access to a service provided by service provider 1504 either by first contacting the service provider 1504 or by first authenticating with identity provider 1506 and then accessing the service provided by service provider 1504. For example, user agent 1502 may send to service provider 1504 a request to access the service (arrow 1). If service provider 1504 determines there is no existing (i.e., previously authenticated) session with user agent 1502, service provider 1504 may be configured to redirect (arrow 2) the user agent 1502 to identity provider proxy 1508 (arrow 3), which in turn may redirect the user agent 1502 to identity provider 1506 (arrow 4) via a communication signed by identity provider proxy 1508 using a certificate associated with service provider proxy 1512. Identity provider 1506 may challenge the user agent 1502 for credentials, and upon successful login may provide to user agent 1502 for presentation to service provider proxy 1512 (arrow 5) a first (SAML or other) assertion, which service provider proxy 1512 may be configured to use to provide to user agent 1502 a second (SAML or other) assertion (arrow 6), signed by service provider proxy 1512 using a certificate associated with identity provider proxy 1508, to be presented to service provider 1504 (arrow 7) to gain access to the service (or other resource).

In various embodiments, identity provider-initiated authentication may be implemented by user agent 1502 being used to access and log in via identity provider 1506, prior to attempting to access the service associated with service provider 1504. Upon successful login, identity provider 1506 may provide via a graphical or other user interface presented at user agent 1502, e.g., a webpage, a list or other representation of one or more services the authenticated user may access. Selection of a service associated with service provider 1504 may result in the identity provider 1506 providing to user agent 1502 for presentation to service provider proxy 1512 a first (SAML or other) assertion, which service provider proxy 1512 may be configured to use to provide to user agent 1502 a second (SAML or other) assertion, signed by service provider proxy 1512 using a certificate associated with identity provider proxy 1508, to be presented to service provider 1504 to gain access to the service (or other resource).

In various embodiments, one or more certificates described above with reference to FIG. 15 may be distributed and/or stored using techniques disclosed herein.

In various embodiments, a Cloud Management Service (CMS) 1550 is provided to manage storage of data in the cloud. In various embodiments, the CMS may store both public and private keys for one or both of an identity provider (IdP) proxy and a service provider (SP) proxy. The proxies may reside in one or more security proxy servers. The identity provider proxy and/or service provider proxy key may be distributed to one or more deployed security proxy servers. The SP-proxy private key in various embodiments may be used to sign SAML authentication tokens.

In typical cloud management service systems, since the service provider (SP) may be configured to allow access based on a determination that a received SAML token is signed by the SP-proxy certificate, an adversary who steals this certificate may be able to log into any configured SP as any user from that organization (e.g. SalesForce® as a tenant admin).

Applying the techniques described herein to system 1500 advantageously limits damage done by a completely compromised security proxy server because after the security proxy server has been removed, the security proxy server is limited to access permitted by the most recent profile it is able to decrypt. For example, CMS is not able to add a new security proxy server to a profile without customer admin interaction. As another example, CMS is not able to introduce new IDP-proxy or SP-proxy certificates without customer admin approval. In some embodiments, CMS is prevented from introducing new IDP-proxy or SP-proxy certificates because the system is configured to prompt an administrator to configure the IDP/SP to use specific certificates separately from CMS. Thus, replacing these certificates on CMS will not grant an attacker access to the SP/IDP but merely break the overall configuration. In some embodiments, integrity protection is included within the system to prevent unauthorized modification of customer configurations.

The techniques described here improve a user experience and improve security. In one aspect, administrators are prompted for their password as infrequently as possible. For example, admins are prompted to enter their password only when logging in or when adding/removing a security proxy server to a profile. In some embodiments, the latter may be necessary because it may be necessary to recover the plaintext profile password using the administrator's password before encrypting it with the security proxy server's public key.

The techniques described here provide management and storage of data on a cloud and distribution of data from the cloud to another system that reads and makes use of the data. The techniques described here prevent a security breach of a cloud-based service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request, a first secret data, and a second secret data including a public key of a remote security proxy server;
   mapping the request to the first secret data;
   identifying a first encrypted data to retrieve based on the request;
   using the first secret data to decrypt the first encrypted data to generate a decrypted data including by recovering a public key from the first secret data;
   discarding the first secret data;
   generating a second encrypted data by using the second secret data to encrypt the decrypted data; and
   providing the second encrypted data to the remote security proxy server, wherein the security proxy server does not own the first secret data and the second encrypted data is decryptable by a private key of the security proxy server.

2. The method of claim 1, wherein the first secret data includes a password.

3. The method of claim 1, further comprising prior to the receipt of the first secret data and the second secret data:
   receiving a storage request, wherein the storage request includes data to be stored and a third secret;
   encrypting the data using the third secret;
   writing the data to memory; and
   discarding the third secret.

4. The method of claim 3, wherein the writing the data to memory includes storing the data to a cloud service such that the cloud service is unable to decrypt the data.

5. The method of claim 1, further comprising registering a security proxy server including:
- receiving login data including an administrator password, a security proxy password, and tenant information;
- authenticating the security proxy based on the received login data;
- receiving registration information including a security proxy public key; and
- storing the security proxy public key.

6. The method of claim 1, further comprising creating a profile including:
- receiving a request to create a profile;
- retrieving an administrator public key;
- generating a profile password;
- associating the administrator public key and the profile password;
- generating a profile key pair;
- generating the profile; and
- creating a file with the profile key pair protected with the generated profile password.

7. The method of claim 6, further comprising assigning a security proxy server to the profile including:
- receiving a request to add a security proxy server to a profile;
- recovering an administrator key with an administrator password;
- decrypting a profile password using the administrator key;
- encrypting the profile password with a security proxy public key; and
- storing the encrypted profile password.

8. The method of claim 1, further comprising removing a security proxy server, wherein the security proxy is removed without re-provisioning other security proxy servers.

9. The method of claim 1, further comprising removing a security proxy server including:
- receiving a request to remove a security proxy from a profile;
- recovering a profile password with an administrator password;
- changing the profile password; and
- disseminating the changed profile password to other administrators and security proxies.

10. A cloud management system, comprising:
a communications interface to:
- receive a request, a first secret data and a second secret data including a public key of a remote security proxy server; and a processor to:
- map the request to the first secret data;
- identify a first encrypted data to retrieve based on the request;
- use the first secret data to decrypt the first encrypted data to generate a decrypted data including by recovering a public key from the first secret data;
- discard the first secret data;
- generate a second encrypted data by using the second secret data to encrypt the decrypted data; and
- provide the second encrypted data to the remote security proxy server, wherein the security proxy server does not own the first secret data and the second encrypted data is decryptable by a private key of the security proxy server; and a memory coupled to the processor to provide the processor with instructions.

11. The cloud management system of claim 10, wherein the communications interface further:
- receives a storage request, the storage request including data to be stored and a third secret; and
the processor further:
- encrypts the data using the third secret;
- writes the data to memory; and
- discards the third secret.

12. The cloud management system of claim 10, wherein the cloud management system provides access control and key management and distribution.

13. The cloud management system of claim 10, wherein the cloud management system services a plurality of security proxies and a security proxy server is addable or removable without re-provisioning each of the other security proxy servers.

14. The cloud management system of claim 10, wherein no private keys from the security proxy are stored in the cloud management system.

15. The cloud management system of claim 10, wherein the cloud management system:
- accommodates a plurality of tenants and respective data security domains; and
- provides only an entity with a key to decrypt certificate private keys access to a protected resource belonging to a tenant.

16. The cloud management system of claim 10, wherein the first secret data includes a password using which a public key is recoverable.

17. A computer program product, the computer program product being embodied in a non-transitory computer readable storage medium and comprising computer instructions for:
- receiving a request, a first secret data, and a second secret data including a public key of a remote security proxy server;
- mapping the request to the first secret data;
- identifying a first encrypted data to retrieve based on the request;
- using the first secret data to decrypt the first encrypted data to generate a decrypted data including by recovering a public key from the first secret data;
- discarding the first secret data;
- generating a second encrypted data by using the second secret data to encrypt the decrypted data; and
- providing the second encrypted data to the remote security proxy server, wherein the security proxy server does not own the first secret data and the second encrypted data is decryptable by a private key of the security proxy server.

* * * * *

UNITED STATES PATENT AND TRADEMARK OFFICE
CERTIFICATE OF CORRECTION

PATENT NO. : 10,339,339 B2  
APPLICATION NO. : 15/429620  
DATED : July 2, 2019  
INVENTOR(S) : Timothy Jackson Page 1 of 1

It is certified that error appears in the above-identified patent and that said Letters Patent is hereby corrected as shown below:

On the Title Page

Item (73), Assignee, delete "MOBILERON" and insert --MOBILEIRON--, therefor.

In the Claims

In Column 15, Claim 10, Line 46, after "first secret data", insert --,--.

Signed and Sealed this
Nineteenth Day of November, 2019

Andrei Iancu
*Director of the United States Patent and Trademark Office*